(12) United States Patent
Ostrohov et al.

(10) Patent No.: US 11,434,961 B2
(45) Date of Patent: Sep. 6, 2022

(54) CLUTCH ACTUATOR AND METHOD FOR CONTROLLING A CLUTCH ACTUATOR

(71) Applicant: FTE automotive GmbH, Ebern (DE)

(72) Inventors: Dimitri Ostrohov, Ebern (DE); Paul Stawinoga, Ebern (DE)

(73) Assignee: FTE automotive GmbH, Ebern (DE)

( * ) Notice: Subject to any disclaimer, the term of this patent is extended or adjusted under 35 U.S.C. 154(b) by 0 days.

(21) Appl. No.: 16/952,333

(22) Filed: Nov. 19, 2020

(65) Prior Publication Data

US 2021/0180655 A1 Jun. 17, 2021

(30) Foreign Application Priority Data

Dec. 16, 2019 (DE) ...................... 10 2019 134 460.3

(51) Int. Cl.
*F16D 27/01* (2006.01)
*F16D 28/00* (2006.01)
(Continued)

(52) U.S. Cl.
CPC .............. *F16D 27/01* (2013.01); *F16D 28/00* (2013.01); *F16D 48/064* (2013.01);
(Continued)

(58) Field of Classification Search
CPC ........ F16D 27/01; F16D 28/00; F16D 48/064; F16D 2121/24; F16D 2125/24;
(Continued)

(56) References Cited

U.S. PATENT DOCUMENTS 4,546,296 A * 10/1985 Washbourn ........... B60T 8/1893
188/162
8,324,890 B2 * 12/2012 Lin ........................ G01D 5/145
324/207.2
(Continued)

FOREIGN PATENT DOCUMENTS

CN 109565215 A 4/2019
DE 101 57 504 A1 8/2002
(Continued)

OTHER PUBLICATIONS

Extended European Search Report dated May 25, 2021 in European Patent Application No. 20212638.9, citing documents AO and AP therein, 6 pages.
(Continued)

*Primary Examiner* — Richard W Ridley
*Assistant Examiner* — Aimee Tran Nguyen
(74) *Attorney, Agent, or Firm* — Oblon, McClelland, Maier & Neustadt, L.L.P.

(57) ABSTRACT

A clutch actuator for actuating a clutch in the drive train of a motor vehicle, having a housing, a drive, a pushrod, which can be adjusted in an axial direction by the drive, a tappet, which is coupled to the pushrod, and a guide component which is accommodated movably in the housing and receives that end of the tappet which faces the pushrod. At least one stroke sensor, which is associated with the guide component, and a rotation angle sensor, which is associated with the drive, are provided. Embodiments relate to an assembly having a clutch actuator of this kind and a controller, the controller is set up and designed to determine the start of the release stroke of a clutch actuated by the clutch actuator from a comparison of the signal of the stroke sensor and the signal of the rotation angle sensor.

9 Claims, 3 Drawing Sheets

(51) Int. Cl.
*F16D 48/06* (2006.01)
*F16D 121/24* (2012.01)
*F16D 125/24* (2012.01)

(52) U.S. Cl.
CPC ...... *F16D 2121/24* (2013.01); *F16D 2125/24* (2013.01); *F16D 2500/1023* (2013.01); *F16D 2500/3021* (2013.01); *F16D 2500/3026* (2013.01)

(58) Field of Classification Search
CPC ..... F16D 2500/1023; F16D 2500/3021; F16D 2500/3026
See application file for complete search history.

(56) References Cited

U.S. PATENT DOCUMENTS

| | | | |
|---|---|---|---|
| 2003/0169033 A1* | 9/2003 | Tromblee | G01D 5/145 324/207.2 |
| 2012/0227524 A1* | 9/2012 | Takahashi | H02K 11/215 74/89.34 |
| 2014/0004218 A1* | 1/2014 | Esser | B29C 45/281 425/162 |
| 2014/0048378 A1* | 2/2014 | Kim | F16C 33/10 192/94 |
| 2015/0070003 A1* | 3/2015 | Elliott | G01D 11/245 324/207.2 |
| 2016/0305519 A1 | 10/2016 | Schumann et al. | |
| 2019/0040939 A1* | 2/2019 | Matsuto | F16H 25/2015 |
| 2020/0088247 A1* | 3/2020 | Ryba | H02K 7/116 |
| 2020/0102990 A1* | 4/2020 | Dietrich | H02K 11/21 |

FOREIGN PATENT DOCUMENTS

| | | | | |
|---|---|---|---|---|
| DE | 601 13 946 T2 | 6/2006 | | |
| DE | 10 2016 215945 A1 | 3/2018 | | |
| DE | 102018115682 A1 * | 1/2020 | | |
| DE | 10 2018 123 039 A1 | 3/2020 | | |
| JP | 2005330942 A * | 12/2005 | ......... | F01L 1/34406 |
| KR | 20180068415 A * | 6/2018 | | |
| WO | WO 2015/081951 A1 | 6/2015 | | |
| WO | WO-2018036582 A1 * | 3/2018 | ............. | F16D 23/12 |

OTHER PUBLICATIONS

German Search Report dated Jul. 31, 2020 in German Application 10 2019 134 460.3 filed Dec. 16, 2019 (with English Translation of Categories of Cited Documents and Written Opinion), citing documents AO-AR therein, 4 pages.

* cited by examiner

CLUTCH ACTUATOR AND METHOD FOR CONTROLLING A CLUTCH ACTUATOR

FIELD

The invention relates to a clutch actuator for actuating a clutch in the drive train of a motor vehicle, having a housing, a drive, a pushrod, which can be adjusted in an axial direction by the drive, a tappet, which is coupled to the pushrod, and a guide component, which is accommodated movably in the housing and receives that end of the tappet which faces the pushrod.

BACKGROUND

A clutch actuator of this kind can be used to open and close a friction clutch in the drive train of a motor vehicle, in particular of a heavy goods vehicle. Here, the tappet generally acts on a release bearing of the clutch via a release lever. As a drive, it is possible, for example, to use an electric motor, the rotation of which is converted into a stroke of the pushrod and hence of the tappet by a suitable mechanism.

Above and beyond the actuation of the clutch, the clutch actuator is also used for automatic wear adjustment. This is accomplished by the fact that, after the clutch has been re-engaged, the pushrod is not always returned to the same starting position, the starting position instead changing in accordance with the wear of the clutch. Here, wear adjustment can take place over a range of up to 90 mm of the stroke of the pushrod.

Another aspect of such clutch actuators is that the pushrod should be free from load in the coupled state of the clutch, i.e. should be retracted somewhat further than the zero point (the point at which the release bearing transmits an axial load), e.g. 1 to 4 mm. Otherwise, any vibration in the clutch would be transferred continuously to the clutch actuator and would result in increased wear in the long term.

BRIEF SUMMARY

It is the object of the invention to provide a clutch actuator which allows precise actuation of the clutch, while wear adjustment and relief of the load on the pushrod in the coupled mode should be possible at the same time.

To achieve this object, at least one stroke sensor, which is associated with the guide component, and a rotation angle sensor, which is associated with the drive, are provided according to the invention in a clutch actuator of the type stated at the outset. To achieve the object, the invention furthermore provides an assembly having a clutch actuator of this kind and a controller, wherein the controller is set up and designed to determine the start of the release stroke of a clutch actuated by the clutch actuator from a comparison of the signal of the stroke sensor and the signal of the rotation angle sensor.

The invention is based on the basic concept of detecting both a movement of the drive and a movement of the guide component and hence of the tappet. By virtue of the decoupling, desired in the coupled state, between the tappet and the pushrod, activation of the drive is not equivalent to a stroke of the pushrod. By detecting the rotational position of the drive at which the guide component begins to move, the zero point for the actuation of the clutch can be determined very precisely.

As sensors, it is possible, in particular, to use Hall-effect sensors or GMR sensors, which make it possible to detect the desired movement with a very high accuracy.

The guide component is preferably provided with a permanent magnet, thus enabling the stroke of the guide component and hence of the tappet to be detected very precisely by means of the stroke sensor.

In order to increase accuracy, it is also possible to arrange two stroke sensors along the stroke of the guide component.

If the two stroke sensors are arranged on a common circuit board, a particularly low assembly effort is involved.

According to one embodiment of the invention, it is envisaged that the pushrod is a spindle which engages in a spindle nut, and that the spindle nut is provided with an annular permanent magnet, with which the rotation angle sensor is associated. In this embodiment, the rotation of the component which leads to adjustment of the pushrod is detected as close as possible to the pushrod, with the result that any play in the power transmission path from an electric motor to the spindle nut does not have any effect.

The rotation angle sensor associated with the annular permanent magnet can be arranged on the same circuit board as the stroke sensors, and therefore no additional assembly effort is required for the rotation angle sensor.

According to one embodiment of the invention, it is envisaged that the drive has an electric motor with a rotor which has a rotor shaft rotatably mounted in the housing, and that the spindle nut is coupled directly to the rotor shaft. By means of this embodiment, frictional losses between the electric motor and the spindle nut, of the kind which would otherwise occur in a gear mechanism, are eliminated.

According to an alternative embodiment, it is envisaged that the pushrod is a rack, in that the drive has a pinion, a gear mechanism and a drive motor, and that the rotation angle sensor is associated with the pinion, with one of the components of the gear mechanism or with a rotor shaft of the electric motor. Particularly if the rotation angle sensor is associated with the rotor shaft of the electric motor, the rotational position of the drive can be detected with high accuracy.

BRIEF DESCRIPTION OF THE SEVERAL VIEWS OF THE DRAWINGS

The invention will be described below on the basis of two embodiments, which are illustrated in the appended drawings. In these drawings.

DETAILED DESCRIPTION

Figure 1:
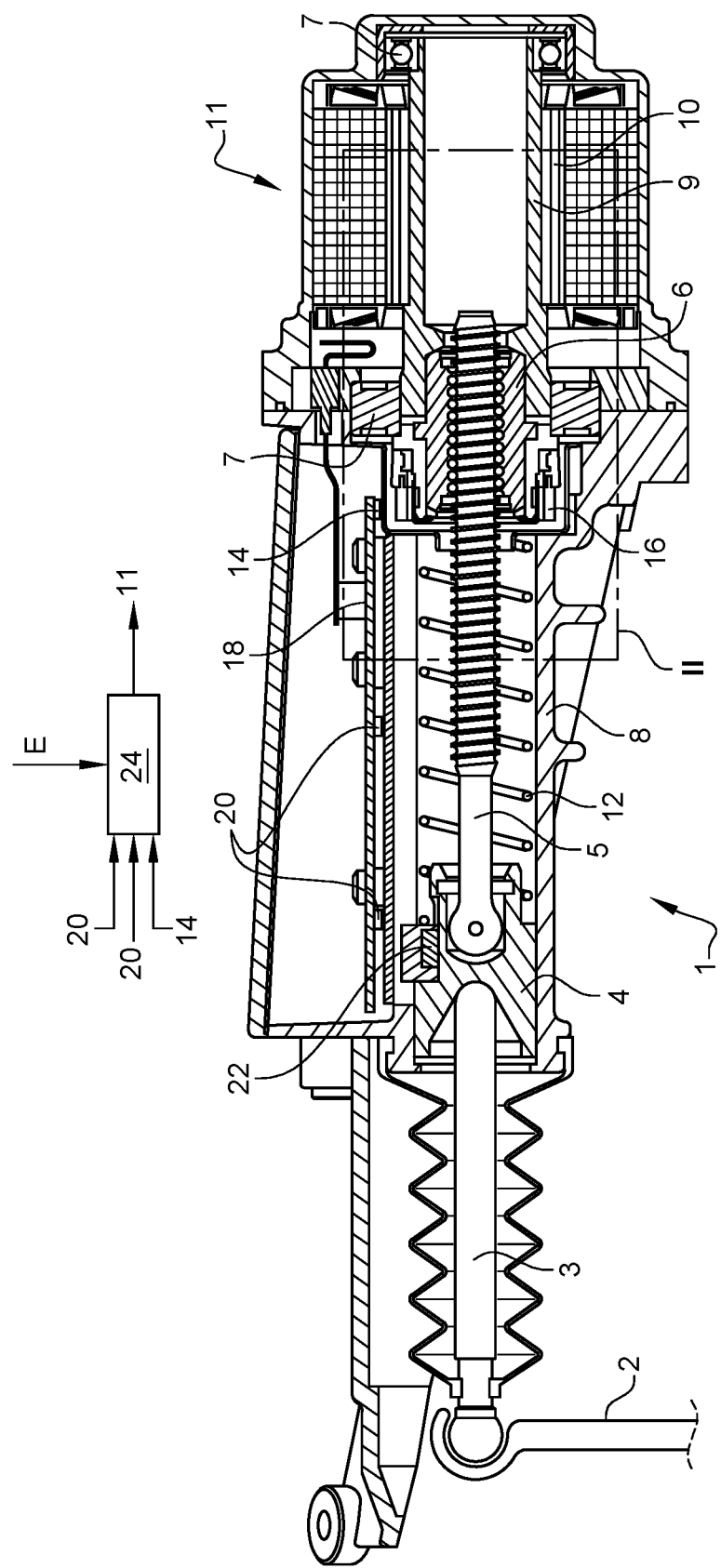
FIG. 1 shows, in a longitudinal section, a clutch actuator according to a first embodiment of the invention.
Figure 2:
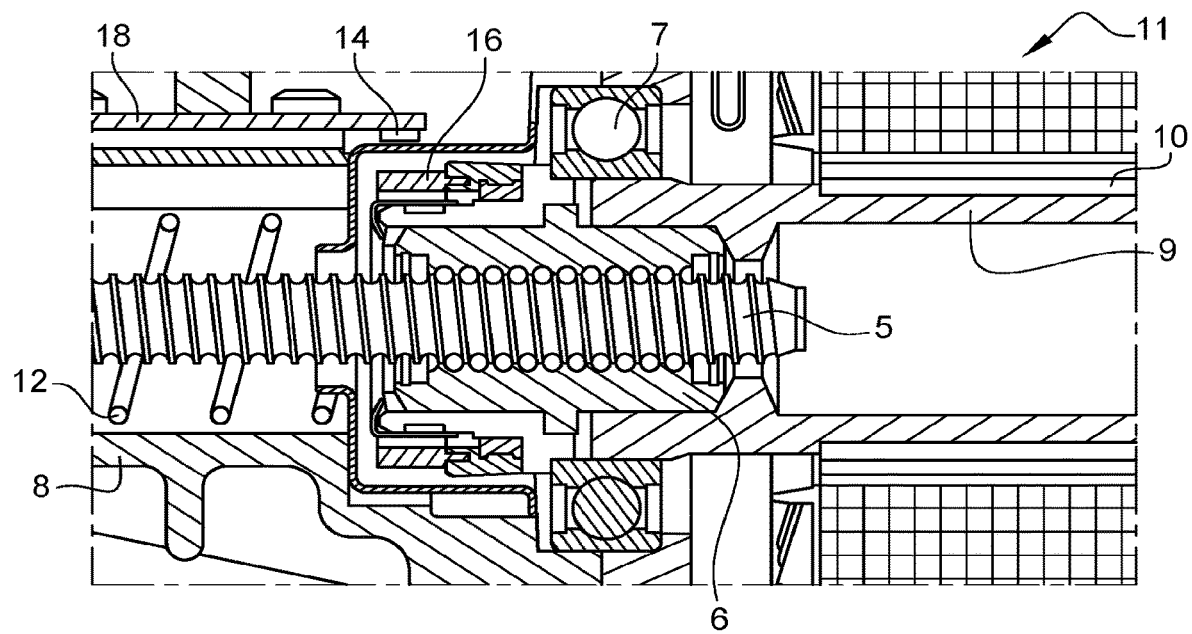
FIG. 2 shows the detail II of FIG. 1 on an enlarged scale.

FIG. 1 shows a clutch actuator 1 which serves to adjust a release lever 2 of a clutch (not shown here) in order to disengage and re-engage the clutch. The clutch can be, in particular, a friction clutch in the power flow between a drive motor and a transmission of a heavy goods vehicle.

Engaging on the release lever 2 is a tappet 3, which is supported on a guide component 4. A pushrod 5, which is here embodied as a spindle, is supported on the opposite end of the guide component 4. That end of the spindle 5 which faces away from the guide component is accommodated in a spindle nut 6, which is mounted rotatably in a housing 8 of the clutch actuator 1 by means of rolling bearings 7.

In the embodiment shown, the spindle nut 6 is mounted for conjoint rotation on a rotor shaft 9, which is part of a rotor 10 of an electric motor 11. By means of the electric motor 11, the spindle nut 6 can be rotated in one or the other direction.

Provided within the housing 8 is a preload spring 12, which is supported by one end on the housing and by the other end on the guide component 4. The preload spring 12 acts on the guide component 4, the tappet 3 and hence the release lever 2 in the direction of disengagement of the clutch.

In FIG. 1, the clutch actuator 1 is shown in a state with a disengaged clutch. In order to engage the clutch, the spindle nut 6 is rotated in the direction which results in a movement of the spindle 5 to the right. This movement is followed by the guide component 4 since it is pushed to the right by way of the tappet 3; the tappet 3, in turn, is pushed to the right by the release lever 2 since said lever is pushed in the corresponding direction by the springs of the clutch and by the release lever.

As soon as the clutch is fully engaged, the release lever 2 cannot move the tappet 3 further to the right. As a result, the guide component 4 also comes to a halt since it is pushed to the left by the preload spring 12. Accordingly, when the spindle nut 6 is operated further in the same direction of rotation, the front end of the spindle 5 rises from the contact surface in the guide component that lies opposite the spindle. The spindle 5 is thereby decoupled from vibration that would otherwise be transferred to the spindle in the coupled state of the clutch.

In order to be able to control the clutch actuator 1 in an optimum manner, the rotational position of the drive (here formed by the electric motor 11 with the rotor 10, the rotor shaft 9 and the spindle nut 6) is detected. A rotation angle sensor 14, which detects the rotation of the spindle nut 6, is provided for this purpose. To this end, the spindle nut 6 is provided with an annular permanent magnet 16, which is mounted on the outer side of the spindle nut 6 for conjoint rotation therewith.

The rotation angle sensor 14 is mounted on a circuit board 18, which extends within the housing 8 from the spindle 6 along the stroke of the guide component 4.

Also mounted on the circuit board 18 are two stroke sensors 20, of which one is situated approximately in the vicinity of the position of maximum advance of the guide component 4 (see FIG. 1) and the other is situated approximately in the vicinity of the position of maximum retraction of the guide component 4 in the coupled state. Here, the sensor positions are chosen in such a way that the entire stroke can be detected by them reliably and precisely.

Associated with the two stroke sensors 20 is a permanent magnet 22, which is mounted in a fixed manner on the guide component 4 on the side thereof facing the stroke sensors 20.

The sensors 14, 20 can be Hall-effect sensors or GMR sensors. By means of these sensors, the rotation angle of the spindle nut 6 and the stroke of the guide component 4 can be detected precisely.

The clutch actuator 1 is controlled by a controller 24, indicated schematically here, which comprises an input signal for the actuation of the clutch and an output for controlling the electric motor 11 of the drive. The controller 24 furthermore receives the signals of the sensors 14, 20. In addition, the controller 24 can perform further functions, but these are not relevant here and are therefore not explained specifically.

When the clutch is engaged, the electric motor 11 is operated in the direction of engagement of the clutch until the guide component 4 "comes to a halt" under the action of the preload spring 12. In addition, the electric motor continues to be operated for a short time to ensure that the spindle 5 is released from the guide component 4. Owing to the wear of the clutch, this point (also referred to as the "zero point" of the guide component 4) is not constant. For this reason, the current zero point of the clutch actuator is stored and regularly updated in the controller 24.

Figure 3:
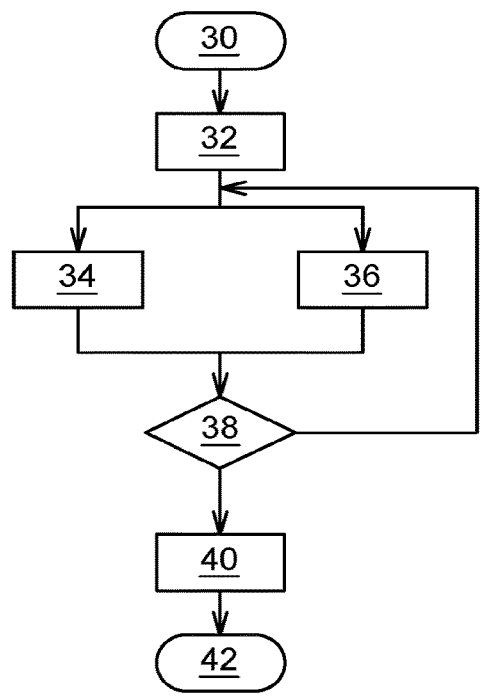
FIG. 3 shows a flow diagram which illustrates the finding of the zero point position of the clutch by the clutch actuator.

On the basis of FIG. 3, it is explained below how the controller 24 can determine the zero point.

In step 30, the controller receives the command to start the electric motor 11. This takes place in step 32.

The stroke sensors 20 and the rotation angle sensor 14 are then interrogated (steps 34 and 36).

In step 38, a check is made to determine whether a movement of the guide component 4 has been detected. If this is not the case, the motor position and the position of the guide component 4 continue to be monitored. If a movement of the guide component 4 is detected, the current position of the guide component 4 and the associated rotational position of the spindle nut 6 are stored as a starting point for the release travel, i.e. for the zero point, in step 40. This concludes the process of storing the zero point as in step 42.

Figure 4:
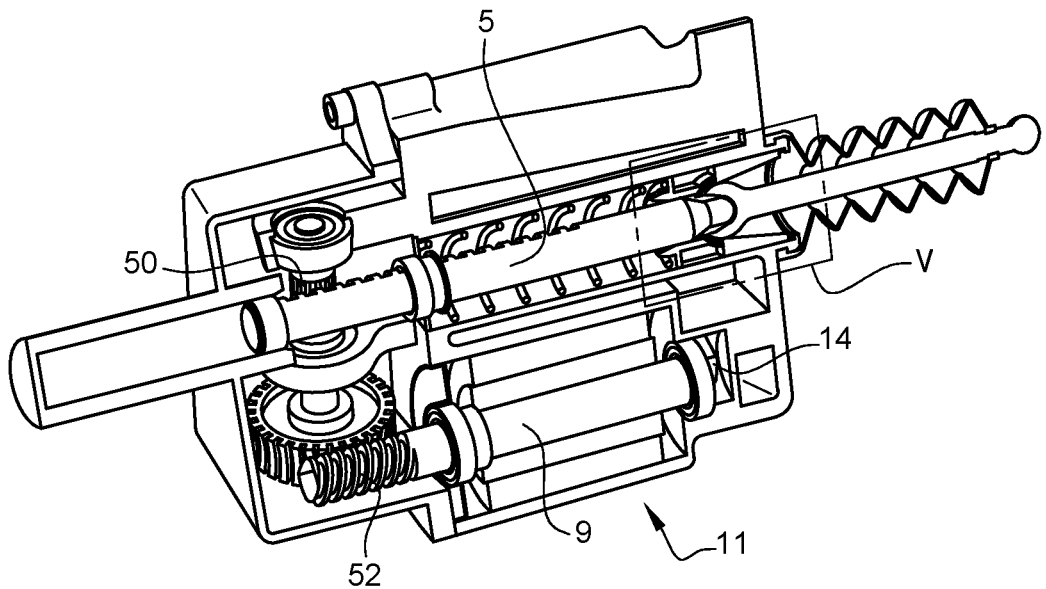
FIG. 4 shows, in a sectional view, a clutch actuator according to a second embodiment.
Figure 5:
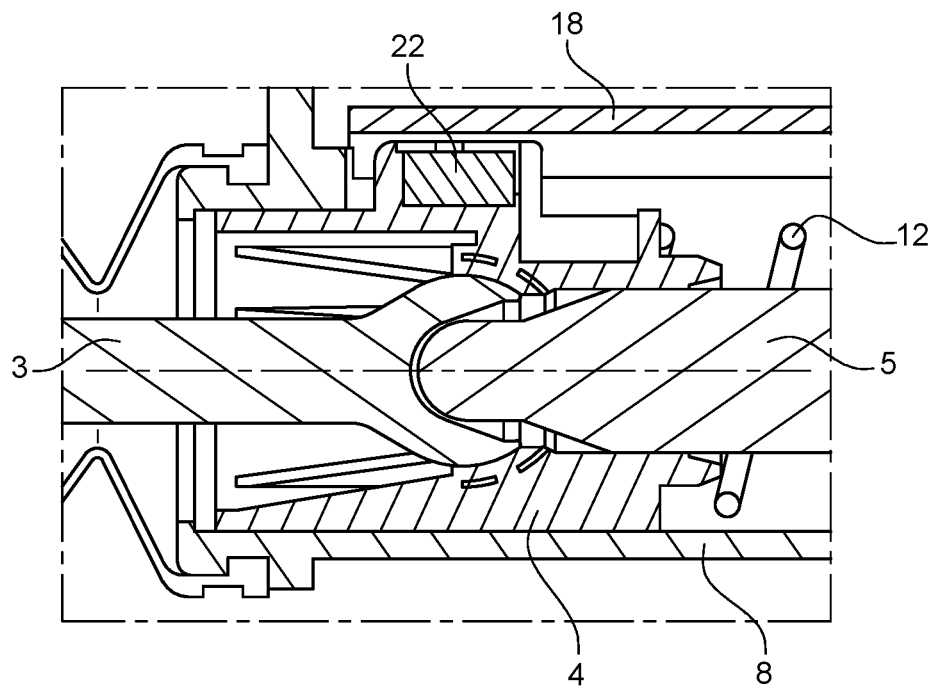
FIG. 5 shows the region V of FIG. 4 on an enlarged scale.

A clutch actuator according to a second embodiment is shown in FIGS. 4 and 5. The same reference signs are used for the components known from the first embodiment, and, to this extent, attention is drawn to the above explanations.

One difference between the first and the second embodiment is that, in the second embodiment, the pushrod 5 is embodied as a rack. This is driven by the electric motor 11 via a pinion 50 and a worm gear mechanism 52. Accordingly, the rotation angle sensor 14 is here associated with the rotor shaft 9.

Another difference between the first and the second embodiment is that, in the second embodiment, the pushrod 5 is coupled directly to the tappet 3. The tappet 3 is snapped into the guide component 4 at its end interacting with the rack 5. In FIG. 5, it can be seen that the front end of the rack 5 is raised slightly from the bottom of the recess in the tappet 3 in which the rack is received.

The mode of operation of the clutch actuator according to the second embodiment corresponds to the mode of operation of the clutch actuator according to the first embodiment, with the difference that, in the second embodiment, the rotational position of the rotor shaft 9 of the electric motor 11 is detected.

The invention claimed is:

1. An assembly comprising:
   a clutch actuator for actuating a clutch in a drive train of a motor vehicle, the clutch actuator including a housing, a drive, a pushrod, which can be adjusted in an axial direction by the drive, a tappet, which is coupled to the pushrod, and a guide component, which is accommodated movably in the housing and receives that end of the tappet which faces the pushrod; and
   a controller,
   wherein at least one stroke sensor, which is associated with the guide component, and a rotation angle sensor, which is associated with the drive, are provided, and
   wherein the controller is set up and designed to determine the start of a release stroke of a clutch actuated by the clutch actuator from a comparison of the signal of the stroke sensor and the signal of the rotation angle sensor.

2. The assembly according to claim 1,
   wherein two stroke sensors are arranged on a common circuit board, and wherein the rotation angle sensor is arranged on the common circuit board.

3. The assembly according to claim 2, wherein at least one of the sensors is a Hall-effect sensor or a GMR sensor.

4. The assembly according to claim 2, wherein the push-rod is a spindle which engages in a spindle nut, and in that the spindle nut is provided with an annular permanent magnet, with which the rotation angle sensor is associated.

5. The assembly according to claim 4, wherein the drive has an electric motor with a rotor which has a rotor shaft rotatably mounted in the housing, and in that the spindle nut is coupled directly to the rotor shaft.

6. The assembly according to claim 1, wherein the guide component is provided with a permanent magnet.

7. The assembly according to claim 6, wherein two stroke sensors are arranged along the stroke of the guide component.

8. The assembly according to claim 7, wherein the two stroke sensors are arranged on a common circuit board.

9. The assembly according to claim 1, wherein the push-rod is a rack, in that the drive has a pinion, a gear mechanism and a drive motor, and in that the rotation angle sensor is associated with the pinion, with one of the components of the gear mechanism or with a rotor shaft of the electric motor.

* * * * *